T. H. KANE.
WINDOW GLASS FASTENER.
APPLICATION FILED DEC. 3, 1909.

1,000,413.

Patented Aug. 15, 1911.

Witnesses:
J. H. Perrault
Elizabeth M. Brown

Inventor
Thomas H. Kane.
By Edward N. Pagelsen.
Attorney

UNITED STATES PATENT OFFICE.

THOMAS HENRY KANE, OF YOUNGSTOWN, OHIO, ASSIGNOR TO TRUSSED CONCRETE STEEL COMPANY, OF DETROIT, MICHIGAN, A CORPORATION OF MICHIGAN.

WINDOW-GLASS FASTENER.

1,000,413.  Specification of Letters Patent.  Patented Aug. 15, 1911.

Application filed December 3, 1909. Serial No. 531,147.

*To all whom it may concern:*

Be it known that I, THOMAS H. KANE, a citizen of the United States, and a resident of Youngstown, in the county of Mahoning and State of Ohio, have invented a new and Improved Window-Glass Fastener, of which the following is a specification.

This improvement relates to means for securing panes of glass in metal sashes, and the object of this invention is to provide a device which can be quickly and easily placed in position, which can be cheaply made, and which shall have ample strength to securely hold the glass in position.

Figure 1:
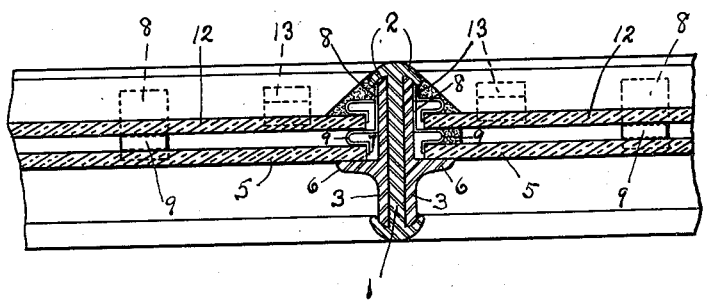
Figure 2:
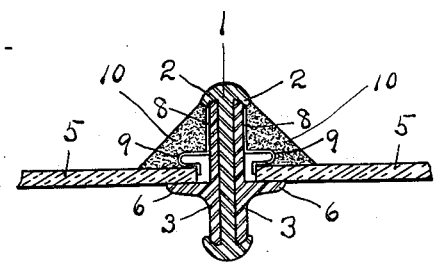
Figure 3:
Figure 4:
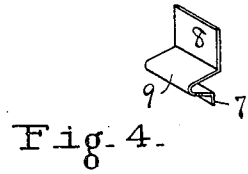
Figure 5:
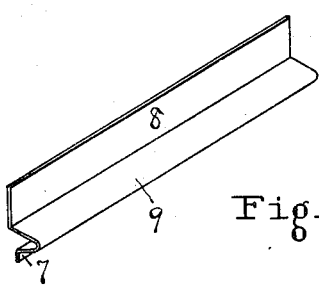

In the accompanying drawing, Figure 1 is a cross section of a portion of window sash showing two forms of this improved fastener holding double panes in position. Fig. 2 is a cross section of a mullion and panes of glass held in position by fasteners and putty. Figs. 3, 4 and 5 are perspective views of these different forms of fasteners.

Similar reference characters refer to like parts throughout the several views.

The window sash shown in the drawing is of the type set forth in the patent to Kahn and Kane, No. 933,908, dated Sept, 14, 1909, but the use of these fasteners is not limited to this type of sash. It may be used advantageously with any sash having a flange or shoulder to furnish a support for the outer edges of the fasteners.

In the drawings, the small I beam 1 has its flanges 2 rolled down to support the flanged bars 3. As shown in the drawings, these flanges 2 project slightly beyond the sides of the flanged bars, forming shoulders against which the edges of the fasteners may rest. The panes 5 of glass are laid against the flanges 6, (Fig. 2) and the small lip 7 of the fasteners are introduced back of the edges of the panes, and the edge of the wide flange 8 sprung into the groove under the flange 2 of the beam 1. As the fasteners are preferably of resilient metal such as brass or steel, the U shaped portion 9 of the fastener will act as a spring to hold the pane against the flange 6. These fasteners may be of any desired length as shown in Figs. 4 and 5. When the desired number of fasteners are in position, putty 10 may be applied as shown in Fig. 2, but this is not necessary when the panes are on the inner side of the flanges 6.

In Fig. 1 a double-pane construction is shown. The panes 5 are held in position, in the manner just described, by short fasteners. The second panes 12 are placed against the U shaped portions 9 of the first fasteners and are in turn secured in position by the fasteners shown in Fig. 3, which are similar to those before described in all particulars excepting that the outer flange 13 is narrower than the flange 8 of the fastener holding the pane 5 in position. As shown in the left hand side of Fig. 1, these fasteners for the panes 5 and 12 may alternate and their projecting portions be embedded in putty. If desired, longer fastening strips may be employed when the flanges 2 of the beams 1 project sufficiently far to engage both the flange 8 and the flange 13, as shown at the right side of the beam 1 in Fig. 1. The resilience of the curved portions of the fasteners will hold the panes from rattling even when no putty is employed. The thickness of the sheet metal from which these fasteners are formed may vary with the work to be done.

The lips 7 of the fasteners are preferably in a different plane from the flanges 8, so that these lips will firmly engage the edge of a pane which is of less width than the distance between opposite bars 3, as shown in the drawings. Owing to the resilience of the metal, these lips can be bent back until they contact with the bars 3, thus accommodating different widths of glass. The U shaped portions of the fasteners will bend to conform to the different conditions.

While the drawings show how the fasteners may be used with cross-bars of window-sashes, it is evident that they will serve equally well in connection with side and end bars.

Having now explained my construction, what I claim as my invention and desire to secure by Letters Patent is:—

1. The combination of a window-sash having flanges and ridges parallel to the same, a pane of glass, and a set of fasteners comprising flat flanges lying against the sash and engaging the ridges, lips engaging the edges of the pane and U shaped portions connecting the lips and flanges and engaging one face of the pane to hold the other face of the pane against the flanges on the sash.

2. The combination of a window-sash having flanges to support the glass and ridges parallel thereto, and fasteners having portions to lie flat against the edges and faces of the glass and flanges to be flat against the sash, the edges of the flanges engaging the ridges on the sash.

3. The combination of a window-sash having flanges and ridges parallel to the same, a pane of glass, a set of fasteners comprising flanges engaging the ridges on the sash, lips engaging the edges of the pane of glass and U shaped portions connecting the lips and flanges and engaging one face of the pane to hold the other face of the pane against the flanges on the sash, a second pane of glass, and a second set of fasteners similar to the first and also engaging the flanges on the sash and the second pane of glass to hold the same against the U shaped portions of the first set of fasteners.

4. The combination of a window-sash comprising bars formed with sides at right angles to the plane of the sash and with flanges to support the panes and with projections spaced a distance from the panes, and resilient fastening devices having flat portions lying against the sides of the sash and with the edges of said flat portion engaging said projections, and having bent portions engaging the sides of the panes.

In testimony whereof, I have signed this specification in the presence of two subscribing witnesses.

THOMAS HENRY KANE.

Witnesses:
  B. Earl Bowlus,
  William Piez.